No. 859,517. PATENTED JULY 9, 1907.
W. C. PRICE.
MOTOR VEHICLE.
APPLICATION FILED MAR. 12, 1906.
2 SHEETS—SHEET 1.
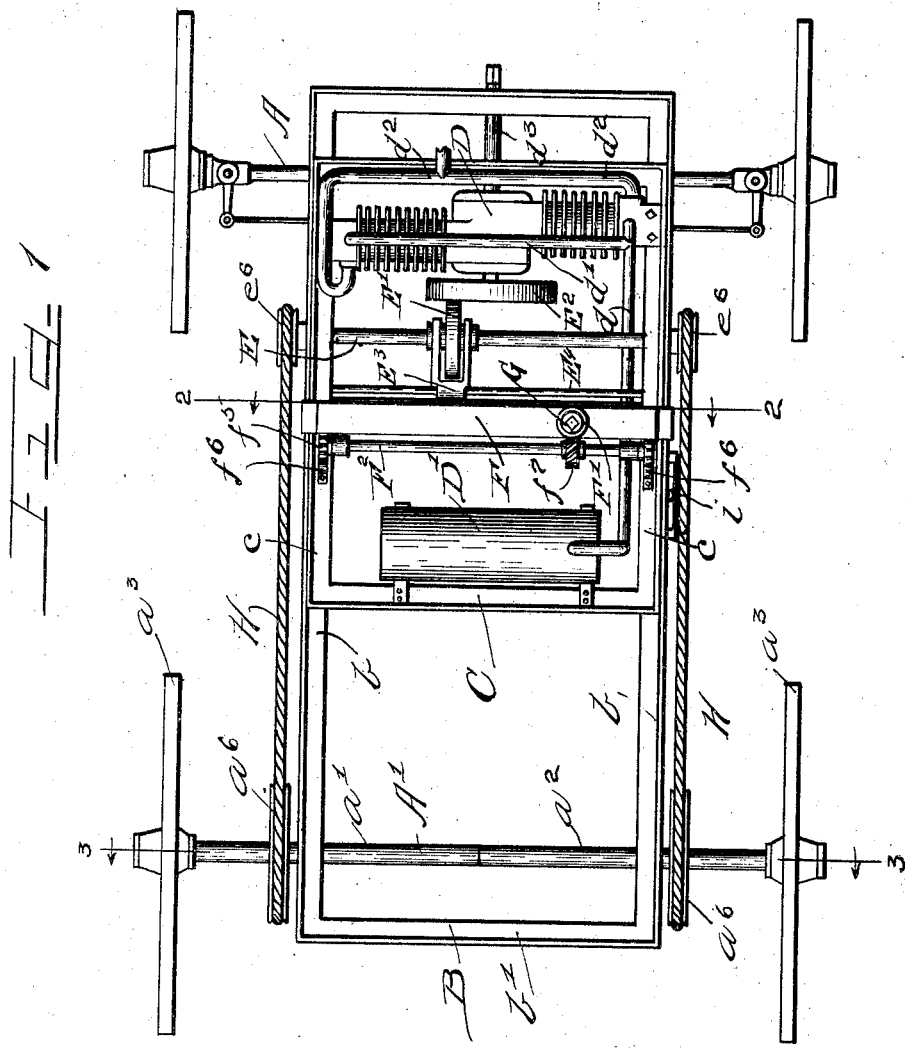

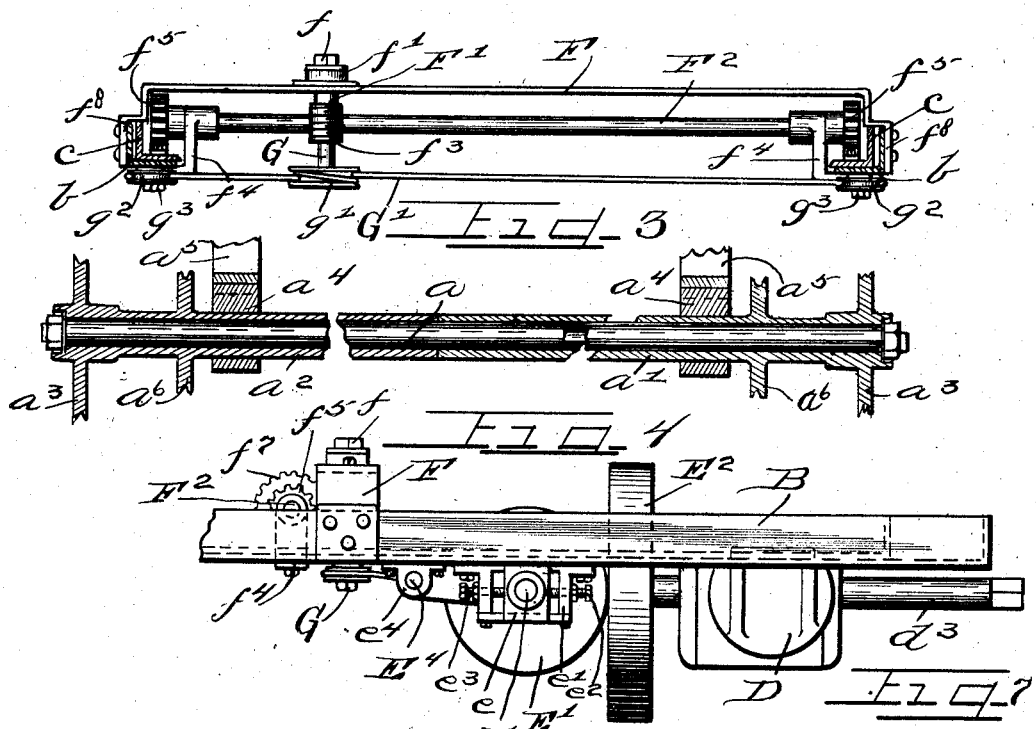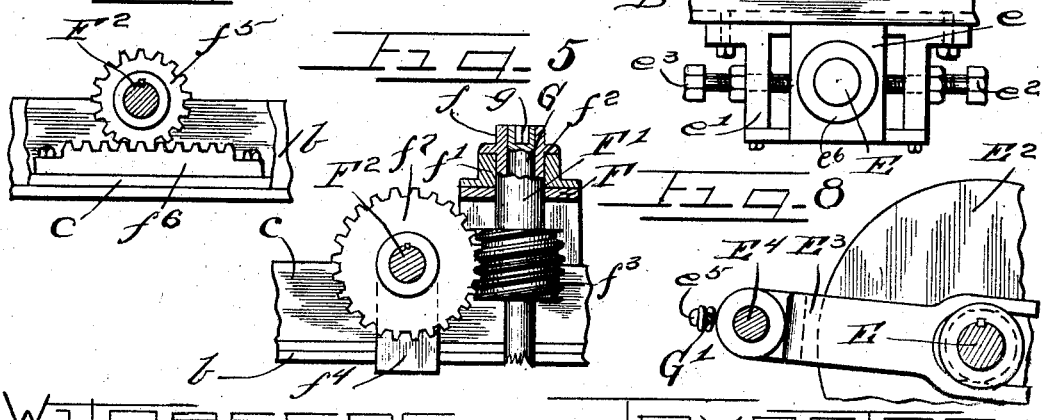

UNITED STATES PATENT OFFICE.

WILLIAM C. PRICE, OF CHICAGO, ILLINOIS, ASSIGNOR TO WEBB & PRICE AUTOMOBILE CO., OF CHICAGO, ILLINOIS.

MOTOR-VEHICLE.

No. 859,517.　　　Specification of Letters Patent.　　　Patented July 9, 1907.

Application filed March 12, 1906. Serial No. 305,556.

*To all whom it may concern:*

Be it known that I, WILLIAM C. PRICE, a citizen of the United States, and a resident of the city of Chicago, in the county of Cook and State of Illinois, have invented certain new and useful Improvements in Motor-Vehicles; and I do hereby declare that the following is a full, clear, and exact description of the same, reference being had to the accompanying drawings, and to the letters of reference marked thereon, which form a part of this specification.

This invention relates to improvements in motor vehicles and more particularly to a motor vehicle in which the motor is adjustably engaged upon the chassis.

Heretofore in vehicles of that class where frictional transmission devices have been used it has usually been customary to adjust one of the friction members to and from the other, and in those instances where the driving member has been adjustable it has been customary to rigidly support the motor upon the chassis and adjustably mount said friction member upon the engine shaft. Furthermore it is ofttimes desirable to employ a flexible driving connection between the transmission shaft and the rear axle and in such cases it has been objectionable to adjust the driven transmission member to and from the driving member since such adjustment varies the tension of said connections.

The object of this invention is to provide a motor vehicle in which the motor and the driving friction member are adjustably mounted upon the chassis to vary the frictional contact of said member with the driven member.

It is also an object of the invention to provide a motor vehicle having novel speed regulating and controlling means in which the parts may be quickly and easily adjusted to wear thus greatly economizing in power.

It is a further object of the invention to provide a vehicle having a flexible drive from the transmission shaft to the axle and provided with means for adjusting the transmission members without interfering with said connections.

The invention consists in the matters hereinafter described and more fully pointed out and defined in the appended claims.

In the drawings: Figure 1 is a top plan view of the chassis of a vehicle embodying my invention. Fig. 2 is a section taken on line 2—2 of Fig. 1, with parts removed. Fig. 3 is an enlarged fragmentary section taken on line 3—3 of Fig. 1. Fig. 4 is an enlarged fragmentary side elevation of the chassis. Fig. 5 is an enlarged fragmentary view of the adjusting mechanism for the engine frame. Fig. 6 is an enlarged detailed view of a part of the adjusting mechanism. Fig. 7 is an enlarged side elevation of the adjustable bearing for the transmission shaft and, Fig. 8 is an enlarged fragmentary view of the means for shifting the driven friction member.

As shown in said drawings: A and A' represent respectively the front and rear axles of the vehicle, the latter of which comprises a shaft $a$ on which are rotatably engaged the elongated bearing sleeves $a'$—$a^2$ to which the rear wheels $a^3$ are rigidly engaged. Mounted on said sleeves $a'$ and $a^2$ near the outer ends thereof are the bearing $a^4$ of any desired construction and secured thereon in any desired manner to permit the axle to rotate therein. Rigidly engaged on said bearings $a^4$ are the supporting brackets $a^5$, shown broken away in Fig. 3, which, if preferred, may be springs or any other desired construction, and on which and on like supporting members on the forward axle, not shown, is rigidly mounted the main frame B of the chassis. Said frame B may be of any preferred construction and material, but, as shown, it comprises side and end members $b$ and $b'$ respectively, constructed of angle iron or like material and one flange of which is directed upwardly on the outer margin of the frame and the other inwardly, thereby forming a bearing seat or guideway for the reception of the motor frame C. Said motor frame, as shown, is constructed similarly to the frame B but is of less length and of a width to fit closely between the upturned flanges of said frame B.

Rigidly mounted in any desired manner upon the forward end of the motor frame C is the constant speed motor D, which may be of any preferred construction but as shown comprises an explosive engine and rigidly engaged on the rear end of said frame is the storage tank D' for the explosive fluid for said engine. Supply pipes $d$ and $d'$ convey the explosive fluid to the inlet ports of said engine and connected with the exhaust ports of said engine are the exhaust pipes $d^2$—$d^2$.

Means are provided for transmitting the power of the engine to the axle A' comprising, as shown, a transverse transmission shaft E journaled in adjustable bearing blocks $e$—$e$ slidably engaged in the bearing brackets $e'$ which are rigidly engaged on the under side of the frame members $b$—$b$ as shown more clearly in Figs. 4 and 7. Set screws $e^2$—$e^3$ are engaged in the front and rear sides of said bearing brackets and bear at their inner ends against said sliding bearing blocks $e$ and rigidly hold the same in adjusted position. Slidably but non-rotatively mounted upon said transmission shaft E is the driven friction member E' which, as shown, comprises a disk of any desired construction and material, and which is adapted to be driven by a similar friction member or disk $E^2$ rigidly engaged upon the engine shaft $d^3$. Engaging on either side of said driven friction member E' are arms of a yoke $E^3$ which is provided in its outer end with a transverse aperture and is slidably engaged upon the guide shaft $E^4$ which is parallel with the transmission shaft and rigidly engaged in brackets $e^4$ secured on the under side of the frame members $b$. As shown adjacent said guide shaft $E^4$ and rearward thereof is a transverse bracket F of metal or other desired material which is provided with downturned ends $f^8$—$f^8$ by means of which it is rigidly engaged to the frame members $b$ by bolting, riveting or in any preferred manner. On the top of said bracket F and registering with an aperture therethrough, as shown more clearly in Fig. 5, is rigidly engaged an elongated bearing $f'$ in which is journaled the vertical, tubular worm shaft $F'$ which, as shown, is provided with an angular upper end $f$ adapted to be engaged by an operating handle or crank or any other desired instrument for operating the same and with a peripheral flange $f^2$ adapted to bear upon the top of said bearing $f'$. On the lower end of the tubular shaft $F'$ is provided a worm $f^3$ adapted to mesh with a worm gear $f^7$ rigidly mounted upon a transverse shaft $F^2$ which as shown is journaled in a suitable bracket $f^4$ rigidly engaged upon the frame members $b$ and extending upwardly therefrom on their inner sides. On the ends of said shaft $F^2$ and above the side frame member $c$ of the motor frame are pinions $f^5$ each adapted to mesh with a rack bar $f^6$—$f^6$ rigidly engaged upon said side members $c$—$c$ and adapted when the worm-shaft is operated to move said motor frame longitudinally of the frame B thereby varying the frictional contact between the friction members $E'$ and $E^2$.

Means are provided for adjusting the driven friction member $E'$ radially of the driving friction member $E^2$, comprising, as shown, a shaft G journaled in and extending through the worm shaft F and which as shown is provided in its upper end with the suitable angular socket $g$ to receive an operating crank or handle as is usual in such devices. On the lower end of the shaft G below the worm $f^3$ is rigidly engaged a grooved pulley $g'$ around which is wound an operating cord or cable $G'$ which extends therefrom transversely of the frame and is trained on similar grooved pulleys $g^2$—$g^2$ journaled on suitable stud shafts $g^3$ on the under side of the frame members $b$—$b$. The ends of said cord are directed inwardly and engaged in a suitable stud or arm $e^5$ on the rear end of the yoke $E^3$ and act when said shaft G is rotated to move said yoke and the driven friction member along the transmission shaft E dependent upon the direction of rotation of said shaft. Any suitable transmission may be provided between the transmission shaft E and the axle $A'$ but as shown grooved pulleys $e^6$—$e^6$ are rigidly engaged on the ends thereof, on the outer sides of said frame members $b$, and on the sleeves $a'$ and $a^2$ of said axle $A'$ are rigidly engaged similar pulleys $a^5$—$a^6$ around which and said pulleys $e^6$ are trained cables or belts H which may be of any desired construction.

The operation is as follows: The vehicle may be provided with any suitable or usual steering mechanism which may be operated from the lever $i$ carried upon the side of the vehicle or in any other desired manner and inasmuch as the motor frame is adjustably mounted upon the vehicle frame C it is obvious that when the worm shaft $F'$ is rotated in one direction said motor frame will be moved forwardly, thereby bringing the friction member $E^2$ out of contact with the friction member $E'$, so that the motor may be started and may continue in operation without transmitting its power to the axle $A'$. When however it is desired to transmit the power to said axle it is only necessary to operate the worm shaft in the opposite direction thereby moving the motor rearwardly and bringing the driving friction member $E^2$ into contact with the driven friction member $E'$. The rate of speed of the vehicle is controlled by the shaft G and the shifting cable $G'$ which act to move the yoke $E^3$ and the driven friction member $E'$ radially of the driving friction member thereby increasing or diminishing the speed of the vehicle dependent upon the direction of the adjustment of said driven friction member. By means of the adjustable bearings $e$ for the transmission shaft it is obvious that the transmission cable or belts may at all times be kept in proper adjustment to prevent slippage upon their pulleys thereby driving the vehicle with a positive motion.

I claim as my invention:

1. In a device of the class described the combination with a main frame of a motor frame slidable longitudinally thereon, a motor on said frame, a driving member thereon, a driven member carried on the main frame and means for shifting the motor frame and throwing the driving and driven members into and out of engagement a shaft engaged to the main frame, means slidable thereon and engaging the driven member adapted to shift the same for different speeds and actuating means for said shift mechanism.

2. In a device of the class described the combination with a main frame of a motor frame slidably engaged therein, a motor on said motor frame and movable therewith, a driving friction member on the motor, a driven friction member on the main frame, means for adjusting the motor frame and motor longitudinally of the main frame and means for adjusting the driven friction member radially of the driving member.

3. In a device of the class described the combination with a main frame of a motor frame slidably engaged thereon, a rack on said motor frame, a shaft journaled on the main frame, a pinion thereon adapted to engage said rack and move the motor frame longitudinally of the main frame, means for rotating said shaft, a motor on the motor frame, a driving friction member thereon, a shaft journaled on the main frame, a driven friction member slidably engaged thereon and means for adjusting said driven member radially of the driving friction member.

4. In a device of the class described the combination with a main frame of a longitudinally adjustable motor frame thereon, a bracket rigidly engaged on the main frame, a vertical shaft thereon, a transverse shaft journaled on the main frame, gears thereon, rack bars rigidly engaged on the motor frame and meshing with said gears and coacting gears on said shafts.

5. In a device of the class described the combination with a main frame of a motor frame slidably engaged thereon, a rack on the motor frame, a transverse shaft journaled on the main frame, a pinion thereon adapted to mesh with said rack, a bracket on the main frame, a crank shaft journaled thereon, means on said crank shaft adapted to rotate said transverse shaft and means for shifting the driven friction member radially of the driving member.

6. In a device of the class described the combination with a main frame of a motor frame slidably engaged thereon, means for moving said motor frame longitudinally of the main frame, a motor on the motor frame, a driving friction disk thereon, a shaft journaled on the main frame, a driven friction disk thereon, a yoke adapted to engage said disk, an operating shaft and a flexible connection between the same and said yoke adapted to move the driven friction disk radially of the driving disk.

7. In a motor vehicle the combination with the axles thereof of a frame supported on said axles, a transmission shaft adjustably engaged on said frame, a friction member slidably engaged thereon, means for adjusting said friction member longitudinally of said shaft, a motor frame on said frame, means for adjusting said motor frame longitudinally, a motor on said motor frame, a driving friction thereon and means operatively connecting said transmission shaft with the rear axle.

8. In a vehicle of the class described the combination with the axles of a main frame carried thereon, a motor frame adjustably supported on said main frame, a motor thereon, a driving speed transmission member on said motor, a transmission shaft adjustably engaged on the main frame, a driven speed transmission member adjustably engaged thereon, a shaft parallel with said transmission shaft, a yoke slidably engaged thereon and engaging said driven member, an operating shaft and a cable connected therewith and with said yoke and acting to shift the driven member radially of the driving member.

9. In a device of the class described the combination with the axles of a main frame supported thereon, a motor frame adjustably engaged on the main frame, a motor thereon, a driving friction member on said motor, a vertical shaft supported on the main frame, a cable operated by said shaft, a transmission shaft, a driven friction member slidably engaged thereon, a yoke engaged on said driven friction member and connected with said cable and operative connections between said transmission shaft and the rear axle.

10. In a device of the class described the combination with a main frame of a motor frame slidably engaged therein, a motor carried on said motor frame, a driving friction disk on said motors, a transversely movable friction disk carried on the main frame, a yoke thereon, an operating shaft, a cable connecting said shaft with said yoke and adapted to move the disk in either direction and means for adjusting the motor frame to bring the friction disks into and out of engagement.

11. In a device of the class described the combination with a main frame of a motor frame slidably engaged thereon, a motor on the motor frame, a driving friction disk thereon, a transverse shaft on the main frame, a driven friction disk thereon, a guide rod, a yoke slidably engaged thereon and adapted to move the driven friction disk radially of the driving disk, an operating shaft, a pulley thereon, a pulley on each side of the main frame and a flexible connection between the pulley on said shaft and the yoke and passing around the pulleys on the main frame.

In testimony whereof I have hereunto subscribed my name in the presence of two subscribing witnesses.

WILLIAM C. PRICE.

Witnesses:
C. W. HILLS,
WM. C. SMITH.